United States Patent [19]

Reed et al.

[11] Patent Number: 4,627,381

[45] Date of Patent: Dec. 9, 1986

[54] DISPOSABLE TRAY AND STAND

[76] Inventors: David M. Reed, 1924 E. 5th Ave., Mesa, Ariz. 85204; Michael R. Johnson, 829 S. Extension, Mesa, Ariz. 85202

[21] Appl. No.: 761,688

[22] Filed: Aug. 2, 1985

[51] Int. Cl.⁴ .................................................. A01K 23/00
[52] U.S. Cl. ....................................................... 119/1
[58] Field of Search .............................................. 119/1

[56] References Cited

U.S. PATENT DOCUMENTS 2,741,223  4/1956  Winborn, Jr. ............................ 119/1
4,271,787  6/1981  Wellmar et al. ......................... 119/1
4,487,163  12/1984 Jobert et al. ............................. 119/1
4,541,360  9/1985  Higgins et al. .......................... 119/1

Primary Examiner—Hugh R. Chamblee
Attorney, Agent, or Firm—Drummond & Nissle

[57] ABSTRACT

A disposable container with litter for animals. The container includes a base containing absorbent particles and a lid shaped and dimensioned to be inverted and placed beneath the base to catch particles pawed from the container by an animal. The container causes an animal to utilize absorbent particles in the central portion of the container and to avoid using absorbent particles near the peripheral areas of the container.

1 Claim, 6 Drawing Figures

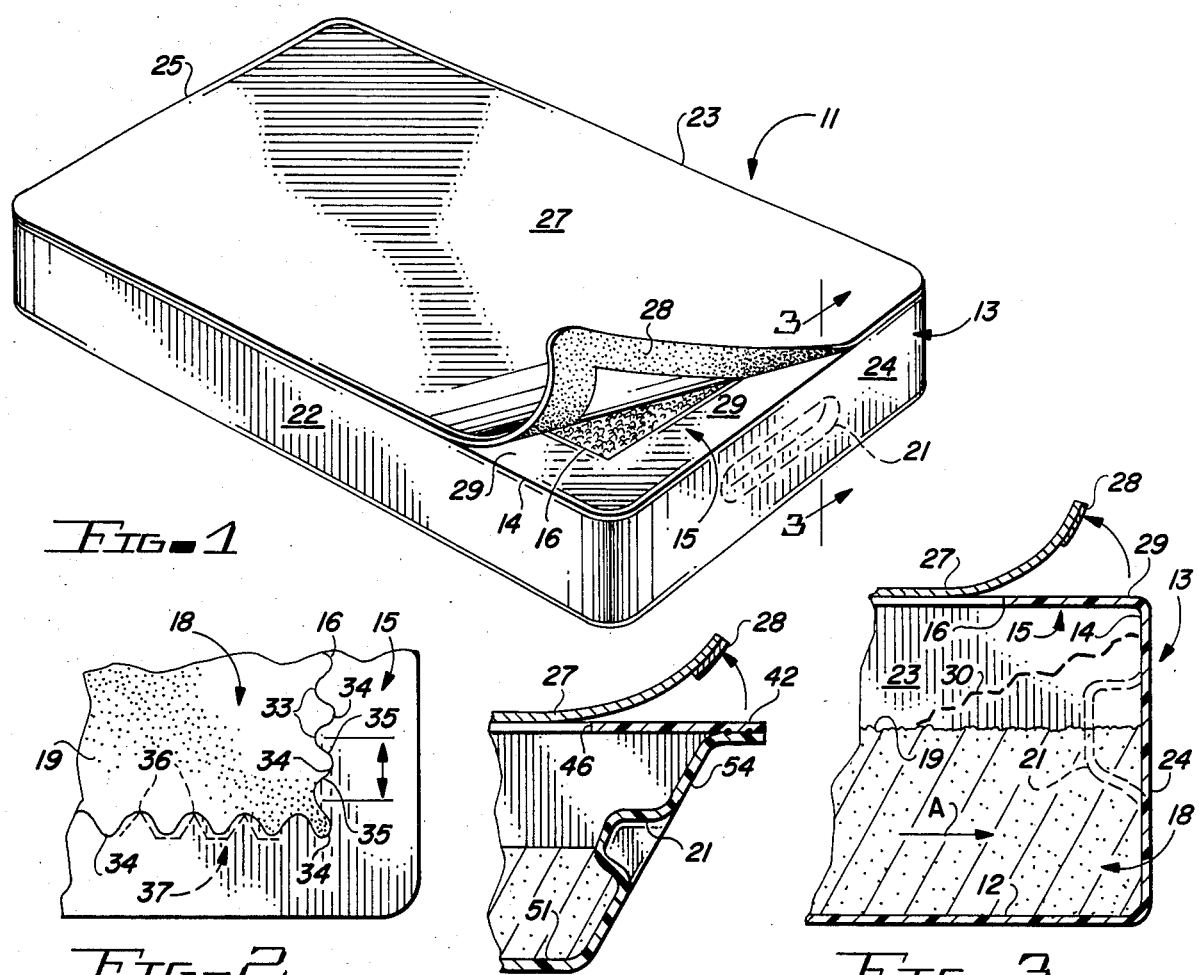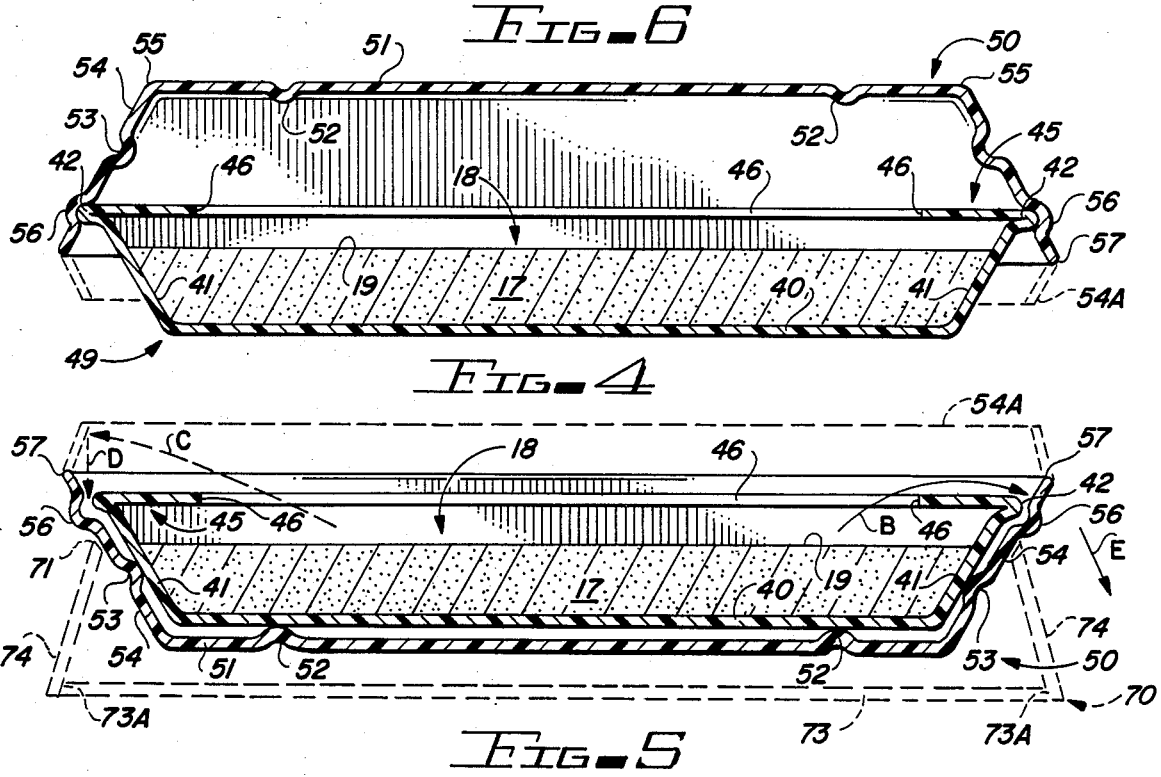

DISPOSABLE TRAY AND STAND

This invention pertains to disposable absorbent particle containers for animals.

More particularly, the invention pertains to a disposable container which includes a base containing absorbent particles and a lid shaped and dimensioned to be placed beneath the base to catch particulate pawed from the container by an animal.

In another respect, the invention pertains to a disposable container of the type described in which the base is constructed to prevent absorbent particles from being pawed from the base onto the surrounding floor area during use of the container by an animal.

In a further respect, the invention pertains to a disposable absorbent particle container which is constructed such that an animal will use particles in the central portion of the container and avoid using particles located or near peripheral areas of the container.

Disposable litter containers are well known in the art. See for example, U.S. Pat. Nos. 3,886,901 to Zeitter, 3,745,975 to Prucha, 4,305,544 to Noonan, 3,684,155 to Smith, 4,164,314 to Edgar, 4,171,680 to Silver et al., 4,271,787 to Wellman et al. and 4,441,451 to Neal. One disadvantage of such prior art absorbent particle containers is that an animal using one of the containers usually scatters absorbent particles from the container onto the floor area surrounding the container, requiring that the floor area be periodically cleaned. One cause of this problem is the tendency of cats and other animals to utilize absorbent particles located adjacent the peripheral edge or walls of the container. Another problem associated with prior art litter containers is that once the containers are opened, they are difficult to seal and must be maintained in an upright position to avoid spillage of litter prior to disposal of the container.

Accordingly, it would be highly desirable to provide an improved disposable absorbent particle container which would, by catching and retaining particles pawed from the container by an animal, minimize the volume of particles scattered onto adjoining floor areas during use of the container by the animal.

Therefore, it is a principal object of the invention to provide an improved disposable absorbent particle container for animals.

Another object of the invention is to provide an improved disposable container having a base containing absorbent particles and a lid which either can be utilized to seal the base or can be placed beneath the base to catch and retain particles pawed from the base during use of the container by a cat or other animal.

A further object of the instant invention is to provide an improved disposable absorbent particle container which encourages an animal to utilize absorbent particles in the central area of the container and to avoid utilizing particles near the edge of the container.

These and other, further and more specific objects and advantages of the invention, will be apparent to those skilled in the art from the following detailed description thereof, taken in conjunction with the drawings, in which:

FIG. 1 is a perspective view of a disposable absorbent particle container constructed in accordance with the principles of the invention;

FIG. 2 is a top view illustrating an alternate embodiment of a container fabricated in accordance with the principles of the invention and having an inner edge shaped and contoured such that an animal's paw is compressed when pushed against the edge;

FIG. 3 is a section view of the container of FIG. 1 taken along section line 3—3 thereof and illustrating further construction details thereof;

FIG. 4 is a side section view of the presently preferred embodiment of the disposable absorbent particle container of the invention;

FIG. 5 is a side section view of the absorbent particle container of FIG. 4 illustrating the mode of operation thereof; and FIG. 6 is a side section view of still another embodiment of the absorbent particle container of the invention.

Briefly, in accordance with my invention, we provide an improved disposable tray container with litter for animals. The tray includes a container having a base and a substantially upright wall about the periphery of the base, the upright wall having an upper edge circumscribing the base; a volume of absorbent particles in the container, the volume being sufficient to maintain a generally horizontally disposed upper surface level of particles above the base and beneath the upper edge of the wall when the particles are evenly distributed over the base; and, a lip attached to and outwardly extending from the upper edge of at least one of the side walls over the base, and having an inner edge spaced away from the wall and from the upper surface level of the particles. The container can include a lid having a peripheral lip and shaped and dimensioned to be positioned beneath the base such that the container is generally maintained in the lid with the base and side walls of the container spaced away from the lid; and, such that the lid encloses and receives the container with the lip of the lid extending upwardly above the lip of the container. The inner edge of the container can include at least one indent shaped and dimensioned such that the paw of an animal is compressed when the paw is pressed into the indent. The inner edge can also include at least one outwardly projecting tooth.

Turning now to the drawings, which depict the presently preferred embodiments of the invention for the purpose of illustrating the practice thereof and not by way of limitation of the scope of the invention, and in which like reference characters represent corresponding elements throughout the several views, FIGS. 1 and 3 illustrate an absorbent particle container constructed in accordance with the principles of the invention and generally indicated by reference character 11. Container 11 includes base 12, peripheral wall 13 and panel-shaped generally horizontally disposed lip 15 extending outwardly over base 12 from upper edge 14 of peripheral wall 13. Lip 15 includes rectangular edge 16 extending around central portion 17 of the volume of absorbent particles 18 generally evenly distributed over base 12 and having generally horizontally disposed upper surface 19. Peripheral wall 13 includes upstanding opposed front 22 and back 23 walls and side walls 24, 25. An indent 21 can be formed in each of side walls 24, 25 and be shaped such that an individual can simultaneously insert the fingers of each hand in one of indents 21 and lift and carry container 11. The periphery of the lower surface of cover sheet 27 is provided with adhesive strip 28. Adhesive strip 28 secures cover 27 to the upper planar surface 29 of lip 15. When container 11 is utilized, adhesive 28 and sheet 27 are peeled from surface 29 in the manner illustrated in FIGS. 1 and 3. Lip 15 and inner edge 16 thereof are spaced away from wall 13 and from generally horizontally disposed upper surface 19 of absorbent particle volume 18 so that when an animal paws absorbent particles 18 from central area 17 of container 11 in the direction of arrow A toward wall 13, the particles tend to accumulate beneath lip 15 in the manner illustrated by dashed line 30 in FIG. 3 and do not travel over lip 15 onto the floor area (not shown) on which container 11 is resting.

Inner edge 16 of lip 15 can, instead of comprising interconnected perpendicular linear straight edges, be contoured and shaped to include peaks 33 and valleys 34. Valleys 34 and peaks 33 are shaped and dimensioned such that when the paw of an animal is pressed between a pair of adjacent peaks 33 and into a valley 34 therebetween, the animal's paw is compressed by edges 35 interconnecting each peak 33 with a valley 34. Peaks 33 can be pointed as indicated by tips 36 of the contoured serrated edge represented by dashed line 37 in FIG. 2. When an animal presses his paw against peaks 33 or pointed tips 36, the pressure caused by peaks 33 or tips 36 against the paw is uncomfortable or painful and tends to cause the animal not to dig in absorbent particles 18 located near edge 16 and side wall 13. Similarly, once an animal compresses his paw between a pair of opposed, spaced-apart edges 35 leading to a common valley 34, an animal tends to avoid digging in particles located adjacent edge 16.

The presently preferred embodiment of the invention is illustrated in FIGS. 4 and 5 and includes a container 49 having base 40 and peripheral upstanding wall 41 with upper edge 42 and lip 45 inwardly depending therefrom. Lip 45 includes inner rectangular edge 46 circumscribing the central portion 17 of absorbent particles 18 generally evenly distributed over base 40. Lid 50 includes upper rectangular horizontally disposed panel member 51 with outwardly projecting nipples 52. Nipples 53 are formed in side wall 54 downwardly depending from peripheral rectangular edge 55 of member 51. Indents 56 snap over upper edge 42 of wall 41. Wall 54 can include an extension, depicted by dashed lines 54A, connected to upper edge 57 of side wall 54 and canted inwardly toward the central portion 17 of particles 18. After lid 50 is removed from container 49, lid 50 can be inverted to function as a stand and receive container 49 in the manner illustrated in FIG. 5. Nipples 52 and 53 serve as point contacts against base 40 and wall 41, respectively, and maintain container 49 spaced away from lid 50. When container 49 is placed inside lid 50, upper edge 57 of wall 54 extends above lip 45 and edge 42 such that particles pawed from within wall 54 in the direction of arrow B in FIG. 5 contact wall 54 below lip 42 and fall downwardly between wall 41 of container 49 and side wall 54 of lid 50. If lid 50 is provided with wall extension 54A, particles pawed from within wall 54 in the direction indicated by arrow C in FIG. 5 can contact wall 54A and fall downwardly between wall 41 and wall 54 as indicated by arrow D.

In FIG. 6, container 49 is provided with a handle indent 21 and cover 27 having adhesive strip 28 around the periphery of the lower surface thereof.

An auxiliary support stand 70 (FIG. 5) can be utilized in conjunction with container 49 and lid 50 of FIGS. 4 and 5. Support stand 70 includes rectangular panel-shaped floor 73 and inwardly canting wall 74 attached to and upwardly projecting from outer edge 73A extending around the periphery of floor 73. When stand 70 is utilized to receive and support lid 50 and container 49, peripheral inner edge 71 of wall 74 contacts and circumscribes lid 50 just below detents 56. Acute angle 72 between wall 74 and floor 73 allows wall 74 to support and stabilize wall 54 when an animal steps on lip 57 and causes a force to be applied to wall 54 in the direction of arrow E. Stand 70 can be shaped and dimensioned such that base 51 of lid 50 contacts base 73 when peripheral edge 71 contacts lid 50 below detent 56 extending around lid 50.

Stand 70 can also be shaped and dimensioned to be utilized only in conjunction with container 49, in which case peripheral edge 71 would contact and circumscribe wall 41 of container 49 just below lip 42. Stand 70 or container 49 can be formed such that base 40 of container 49 contacts floor 73 of stand 70 when edge 71 contacts wall 41 of container 49 just below outer lip 42.

Since wall 74 continuously extends around wall 54 of lid 50, stand 70 can be constructed without floor 73 and consists only of wall 74.

Having described the invention in such terms as to enable those skilled in the art to which it pertains to understand and practice it, and having described the presently preferred embodiments thereof, we claim:

1. A disposable tray with litter for animals, including
    a. a container having a base and a substantially upright wall about the periphery of said base, said upright wall having an upper edge circumscribing said base;
    b. a volume of absorbent particles in said container, said volume being sufficient to maintain a generally horizontally disposed upper surface level of particles above said base and beneath said upper edge of said wall when said particles are evenly distributed over said base;
    c. a lip attached to and outwardly extending from said upper edge of at least one of said side walls over said base, and having an inner edge spaced away from said wall and spaced away from said upper surface level of said particles; and,
    d. a lid having a peripheral lip and shaped and dimensioned to be positioned beneath said base such that
        (i) said container is generally maintained in said lid with said base and wall of said container spaced away from said lid;
        (ii) said lid receives said container such that
            said lid extends upwardly above said lip of said container, and
            particles directed from said container over said lip thereof and against said lip of said lid can fall downwardly between said wall of said container and said lid.

* * * * *